Sept. 8, 1936.  S. JOHNSON  2,053,832
DISPLAY DEVICE
Original Filed Oct. 15, 1934
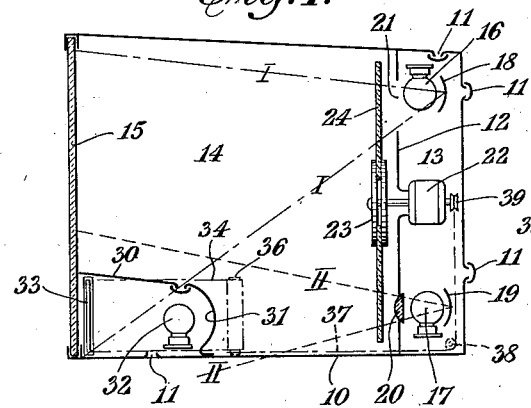
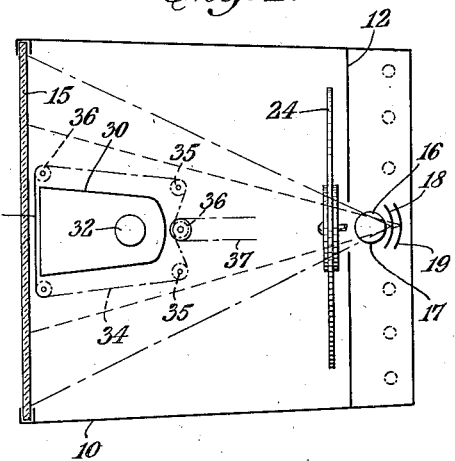
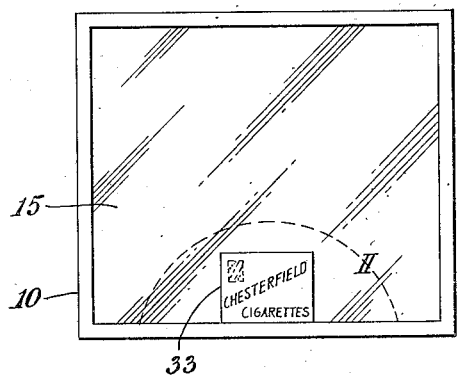
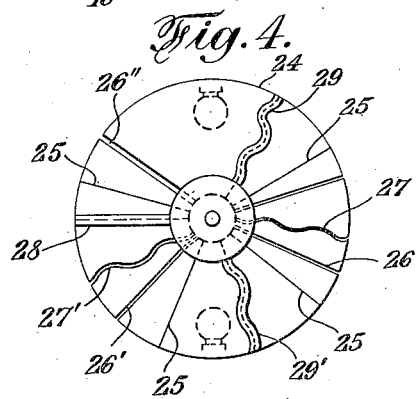
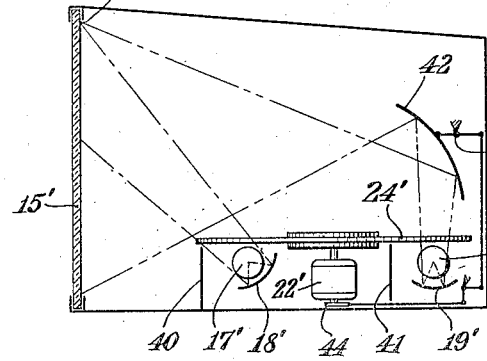
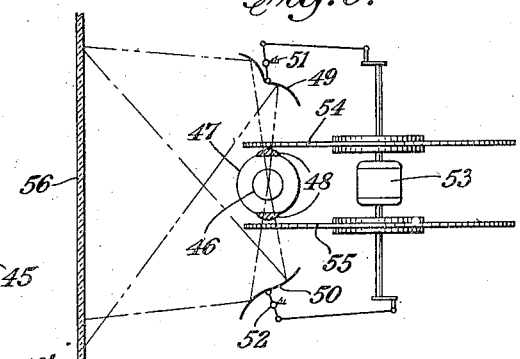
INVENTOR.
Sven Johnson.
BY
his ATTORNEY.

Patented Sept. 8, 1936

2,053,832

UNITED STATES PATENT OFFICE 2,053,832

DISPLAY DEVICE

Sven Johnson, North Bergen, N. J.

Application October 15, 1934, Serial No. 748,312
Renewed July 31, 1936

9 Claims. (Cl. 40—130)

This invention relates to display signs in general, and particularly to what may be termed color-harmony display signs.

One of the principal objects of this invention is to provide a relatively inexpensive, extremely simple and highly attractive display sign, which will automatically arouse the attention of the on-looker, and which will maintain the interest of the on-looker in the sign for an extended period of time.

Another object of this invention is to project various colors in a desired succession upon the screen in such a way that the colored rays will either wholly or in part, intersect with one another before reaching the screen, or which will blend with one another upon meeting at the screen's surface.

Another object of this invention, is to provide within a device of that kind, a simple and inexpensive mechanism which will produce the desired effect of harmonizing and blending different colors into an ever-changing color scheme upon the projection screen.

A further object of this invention is to provide in such device means for directly projecting still or animated advertising matter at one or more portions of the screen, while the blending of colors is taking place on other parts of the screen.

Another object of this invention is to employ in such device a translucent, relatively milk-colored projecting screen, which possesses the properties of facilitating the proper diffusion of the variously colored images projected upon the screen, while preventing visibility into the device.

A still further object of this invention is to provide in a device of this kind a movable, multicolored member, through which light rays are intended to be projected upon the screen, said multicolored member being provided with geometrically regular or geometrically irregular fissures, intended for producing light cloud effects, and with overlaps of geometrically regular or geometrically irregular forms for producing dark cloud effects.

The foregoing, and a great number of other objects and advantages will become more fully apparent from the following description, in conjunction with the accompanying drawing, which latter forms part of this invention, but which is not intended to restrict me in any way as to the specific constructions illustrated.

Referring now to the drawing,

Figure 1 is a vertical cross-section of one form of my device, shown in purely diagrammatical form, Figure 2 is a plan view of my device, partially in cross-section, Figure 3 is a front elevation of a screen upon which are projected the various color rays and also an advertising matter, in one of the many possible arrangements, Figure 4 is a plan view of a multiple colored movable member, in one of its preferred forms, Figure 5 illustrates a modified form of my device, partially in vertical cross-sectional view, and Figure 6 illustrates a diagrammatical form of a still other modification of my device.

Referring now specifically to Figures 1, 2 and 3, numeral 10 denotes a substantially closed casing, provided with ventilations 11 and a partition 12, which latter separates the casing into a light compartment 13, and into a projection compartment 14. The front portion of the projection compartment 14 is equipped with a projection screen 15, which I prefer to make from what is known as milk-glass. That glass is translucent when light rays are directed from within the casing against the screen, however, no objects are visible within the casing when looking through the screen from without.

Within the light compartment is mounted an upper light source 16, and a lower light source 17, both provided with reflectors, indicated at 18 and 19, respectively. In front of light source 17, there is mounted in the partition a lens 20, however, the use of this lens is optional and is not absolutely required. Corresponding to light source 16, there is provided an opening 21, permitting the rays of light source 16 to be projected by reflector 18 against the entire area of screen 15, as indicated by lines I. The rays of light source 17 are chosen in this design to be restricted to a semi-circle, as indicated by lines II in Figures 1 and 3. From Figure 1, it will be clearly observed that the light rays of light source 16 intersect in part with the light rays of light source 17. Thus, a portion of the projected light of both sources are caused to blend together, before reaching the screen.

At about the center of partition 12, there is mounted a motor 22, upon the shaft of which is secured a double disc 23, between which disc is mounted a color record, consisting of a ring of transparent ring segments, varying in sizes and colors. Some of these segments abut with one another closely as indicated at 25, in Figure 4, while some of the segments are spaced from one another by small or larger straight slots or fissures as shown at 26, 26′ and 26′′. Other segments are separated by irregular slots of different widths, as indicated at 27 and 27'. In some places, the abutting edges of the ring segments are covered by a double thickness of layers arranged either in a straight formation, as shown at 28, or in a desired curvature and width, as at 29 and 29'.

The various fissures or slots 26 and 27 permit uncolored light rays to be projected upon the screen, which rays simulate white clouds upon portions of the otherwise colored screen surface. The double layers indicated at 28, 29 and 29' produce, when light is projected through them, the effect of a dark cloud upon the screen.

Inasmuch as the color disc or record 24 is slowly rotated, and the two light sources 16 and 17 are disposed at close proximity to, and at different positions relative to the disc, and their light rays are directed at different angles against the screen, an intermingling or blending of the differently colored light rays produce a pleasant, ever-changing harmony of colors in a constantly moving succession. The color schemes thus produced upon the screen are occasionally pierced by dark or light clouds produced by the overlaps, or the fissures, respectively, as they pass the two light sources.

At the bottom of the casing, I have illustrated a separate compartment 30, with a reflector 31 at the rear, in front of which latter is disposed a third and independent light source 32, adapted to project a steady light ray against a portion of the screen. Interposed between the screen and light source 32 is placed an advertising matter 33, which may be either stationary, or animated, by the use of a moving film, indicated in broken lines at 34. This film runs over a plurality of rollers 35 and 36. The latter roller is actuated by means of a transmission 37, running over idlers 38 to a pulley 39, keyed to the shaft of motor 22. In Figures 1, 2 and 3, projection of light rays II are arranged so that they will appear in a half-circle, intended to imitate the sun. Within that half-circle also appears the advertising matter. The portion about the half-circle is intended to simulate the sky at various phases of the day.

It is obvious, of course, that this invention is in no way limited to just such arrangement, and that not only three light sources may be employed, but any number of them, and that their respective rays may be directed against a screen in any desired fashion so as to produce any number of illusions. Similarly the internal construction of my device may be readily altered to produce such or similar light effects, and that its construction is not necessarily limited to the projection of rays upon vertical screens.

In order to more thoroughly enlarge upon this matter, I have shown in Figure 5 a modified form of my device, in which the record or color disc 24' is disposed closely to, and horizontally above the light sources 16' and 17', whereas its screen 15' is in its normal, vertical position, as shown in Figure 1. In this modified form, I preferably prevent, by a special partition, 40, any of the direct light rays of light source 17' from reaching the screen, except through disc 24'. However, light source 17' may be employed for illuminating a separate advertising compartment, similar to that described in Figure 1 at 30 (not shown in Figure 5). Another partition 41 similarly restricts light source 16'. Behind each of the light sources are provided reflectors 18' and 19', respectively. Reflector 19' projects the rays of light source 16' vertically upwards. These rays are cast by means of a large movable reflector 42 against the screen. The light projections of light source 17' intersect the light rays emitted from reflector 42, and the upper end rays of the projected lights blend with one another at a point marked 43, upon meeting the screen.

Mirror or reflector 42 is operatively connected by means of an eccentric 44, mounted upon the shaft of motor 22', and is intended to swing about a fixed point 45, thereby constantly changing the angular relation of the reflected light rays to the screen. Through this movable mirror or reflector 42, decidedly new color effects are achieved. Otherwise, the construction and operation of this device is very similar to that explained in connection with Figure 1. I wish to emphasize the fact that in this design the rays from source 17' and 16' are projected upwards, which arrangement lends itself to projecting light rays against a horizontally disposed screen, or the ceiling of a room.

For very large display devices with extensive screen areas, arrangements similar to those described in connection with Figures 1 to 5 would not suffice, for which reason a modified form of my invention is shown in Figure 6. In this illustration, a single light source 46 is employed. It is completely housed within a cylindrical casing 47. At two opposite points of the latter are provided lenses 48, through which the light is projected and magnified, and is directed against movable mirrors or reflectors 49 and 50. It will be observed that these reflectors are shaped differently from one another and that they have irregular reflecting surfaces. Both are preferably movably mounted, as indicated at 51 and 52, and are actuated by means of a crank or other arrangement, operatively connected with motor 53. Between lenses 48 and reflectors 49 and 50 are rotatably lodged multiple colored records or discs 54 and 55, driven by motor 53, and which may operate either in the same direction, or in opposite directions relative to one another. Through this arrangement, the light rays, passing through lenses 48 against reflectors 49 and 50, have to penetrate the transparent colored ring sections of the two discs, whereby the light rays directed against screen 56 appear colored. Inasmuch as the reflectors are constantly moving, the two reflected light rays are cast in various directions over large areas. They are caused to either cross-sect before reaching the screen, or blend upon meeting the latter. This construction is intended for use in very large display signs, with which obviously may be provided means for projecting suitable advertising matter upon the screen, as shown at 30 in Figure 1, in addition to the ever-changing color schemes. In this modified form, there will from time to time appear upon the screen some areas which will be bare of any coloring, in which places matter of special advertising interest may be displayed.

All of the different construction illustrated and described in this specification are based upon a few essential principles, without which the exceptionally pleasing color harmony and light effects, in the form of white or dark clouds, upon variously colored, and everchanging fields, could not be achieved. One of the principal features employed resides in the fact that the light sources are disposed as closely as possible to the color records, whereby the light rays are passed directly either through the fissures between color segments, or through the double layers of two translucent segments, and produce distinct, but everchanging projections upon the variously colored screen of light clouds or darkened areas, respectively.

The same arrangement is responsible, in conjunction with lenses or reflectors with which the light sources are equipped, for the formation of relatively broad or wide cones of colored lights.

Another important feature of this invention resides in the formation of at least two broad light cones, by the employment of either one or more light sources, and the blending of such broad light cones upon or before reaching the screen.

Finally, in all of the constructions illustrated, the images of the filaments of the light sources are projected, by the use of lenses or reflectors, or both, through the aforementioned fissures between the color segments in a variously distorted fashion, thereby enhancing the combined fantastic color effects appearing upon the screen.

The foregoing three essential features are combined in all of the modifications illustrated, and form the basic principle upon which the present invention rests.

While I have shown and explained several preferred forms of my invention, it is quite obvious that changes, improvements and modifications may be readily incorporated therein, as they may become necessary, due to the specific employment to which a sign may be put, and I therefore wish to make it clear that I shall reserve for myself the right to make such changes and improvements in my invention, based on the principles set forth, and without departing from the broad scope thereof, as stated in the annexed claims.

I claim:

1. In a device of the class described, a screen, light means, adapted to project intersecting light rays upon said screen, a movable, translucent member, composed of colored sections, between some of which sections fissures are provided, said member being interposed between said screen and said light means, and in close proximity to the latter.

2. In a color display device, a projection screen, light means, adapted to produce and project at least two independent cones of light rays simultaneously upon said screen so that the light rays intersect or blend with one another, and a movable multiple colored translucent member, provided with fissures between its colored portions, interposed between said light rays and the screen, said light means being disposed in close proximity to said translucent member.

3. In a multiple color display device, a projection screen, at least two light sources, provided with light cone-forming means, a multicolor, translucent, movable member, having fissures separating some of the colored sections thereof, interposed between said light sources and said screen, and in close proximity to said light sources, the location of said light sources relative to said movable member being such, that the cone of rays of one light source either intersect the cone of rays of the other light source, prior to reaching the screen, or that the cone of rays of both light sources blend with one another, upon reaching the screen.

4. In a multiple color display device, as set forth in claim 3, another, independent light source disposed behind the screen, and means for projecting a cone of rays from said light source independently thereupon, and a translucent display matter interposed between said independent light source and the screen.

5. In a multiple color display device, as set forth in claim 3, another, independent, shielded light source disposed behind said screen and adapted to project a cone of its rays upon the latter, and a movable, translucent display matter interposed between said screen and said shielded light source.

6. In a multicolor display device, a screen, light means, adapted to produce and project at least two independent cones of light rays simultaneously against the screen at different angles, so that the rays intersect one another before, or blend with one another upon reaching the screen, a multicolored, movable member, provided with fissures between some of its colored sections, interposed between said light means and the screen, and in close proximity to said light means; a light source projecting its rays against the screen, and a display matter interposed between the light source and the screen, the rays of said light source, projected upon said screen, disposed within one of the two independent light rays of said light means.

7. In a multicolor display device, a screen, light means, adapted to produce and project at least two independent cones of light rays simultaneously against the screen at different angles, so that the rays intersect one another before, or blend with one another upon reaching the screen, a multicolored, movable member, provided with fissures between some of its colored sections, interposed between said light means and the screen, and in close proximity to said light means; a light source projecting its rays against the screen, and a display matter interposed between the light source and the screen, the rays of said light source, projected upon said screen, disposed within the two independent light rays of said light means.

8. In a multicolor display device, a screen, light means, adapted to produce and project at least two independent cones of light rays simultaneously against the screen at different angles, so that the rays intersect one another before, or blend with one another upon reaching the screen, a multicolored, movable member, provided with fissures between some of its colored sections, interposed between said light means and the screen, and in close proximity to said light means; a light source projecting its rays against the screen, and a display matter interposed between the light source and the screen, said multicolored movable member being provided not only with fissures, but also with overlaps, for facilitating the production, or simulating the appearance upon the screen, of light clouds and shadows, respectively.

9. In a display device, a screen, at least two light sources, adapted to produce two independent cones of light rays, a multicolored, movable member provided with fissures between some of its colored sections, and with overlaps formed by other sections, interposed between said screen and said light sources, and disposed in close proximity to the latter, and adapted to operate above said light sources, the cone of rays of one of the light sources adapted to be projected directly upon the screen, a reflector mounted above the other light source and adapted to project the cone of rays of the latter against the screen in such a way that the cones of rays of both light sources either intersect before reaching the screen, or blend with one another upon meeting the screen.

SVEN JOHNSON.